May 26, 1953  W. E. ZIMMERMANN  2,639,850
MACHINE FOR DATING AND APPLYING CLOSURES TO BOTTLES
Filed Jan. 23, 1950  9 Sheets-Sheet 1
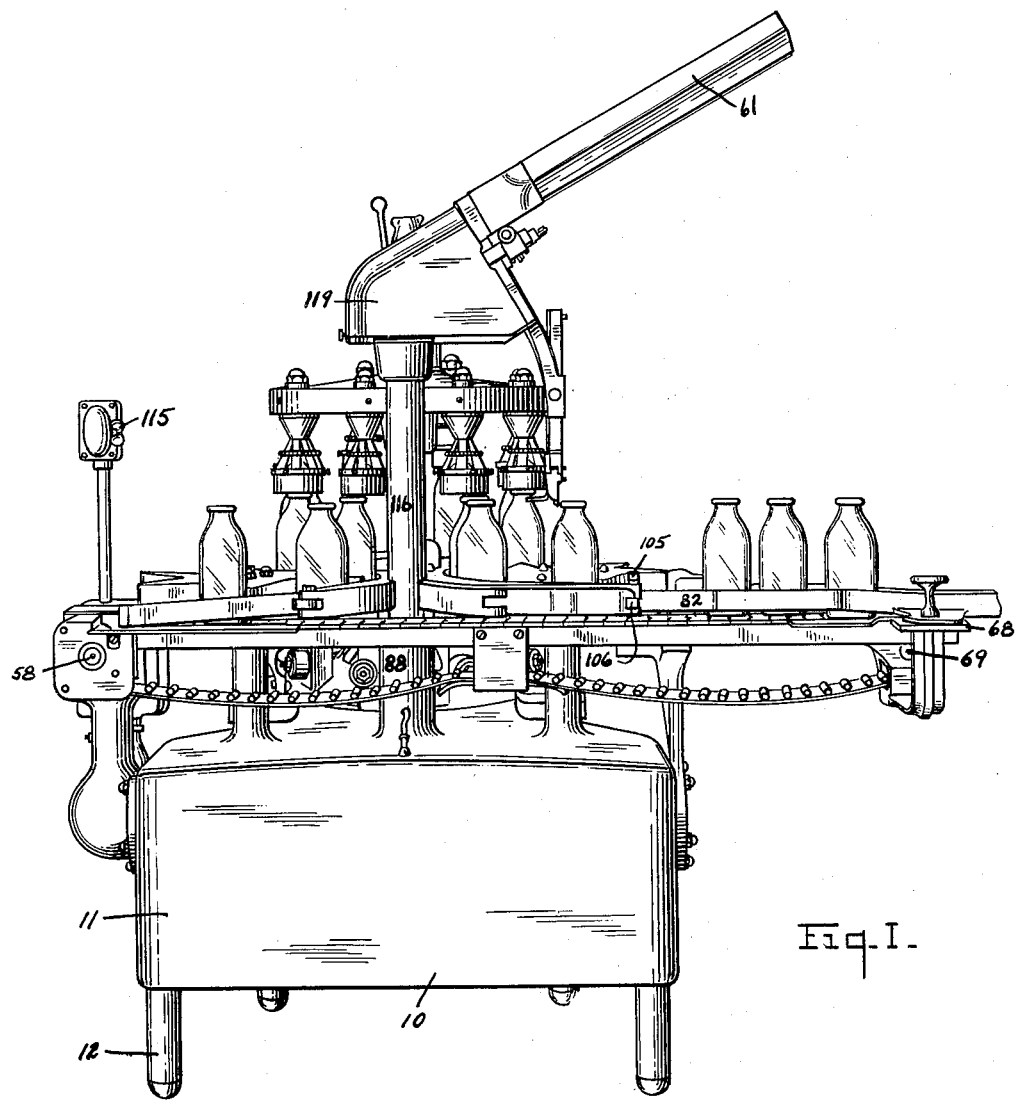
Fig. I.
INVENTOR.
WILLY E. ZIMMERMANN.
BY
Joseph B. Lindecker
ATT'Y.

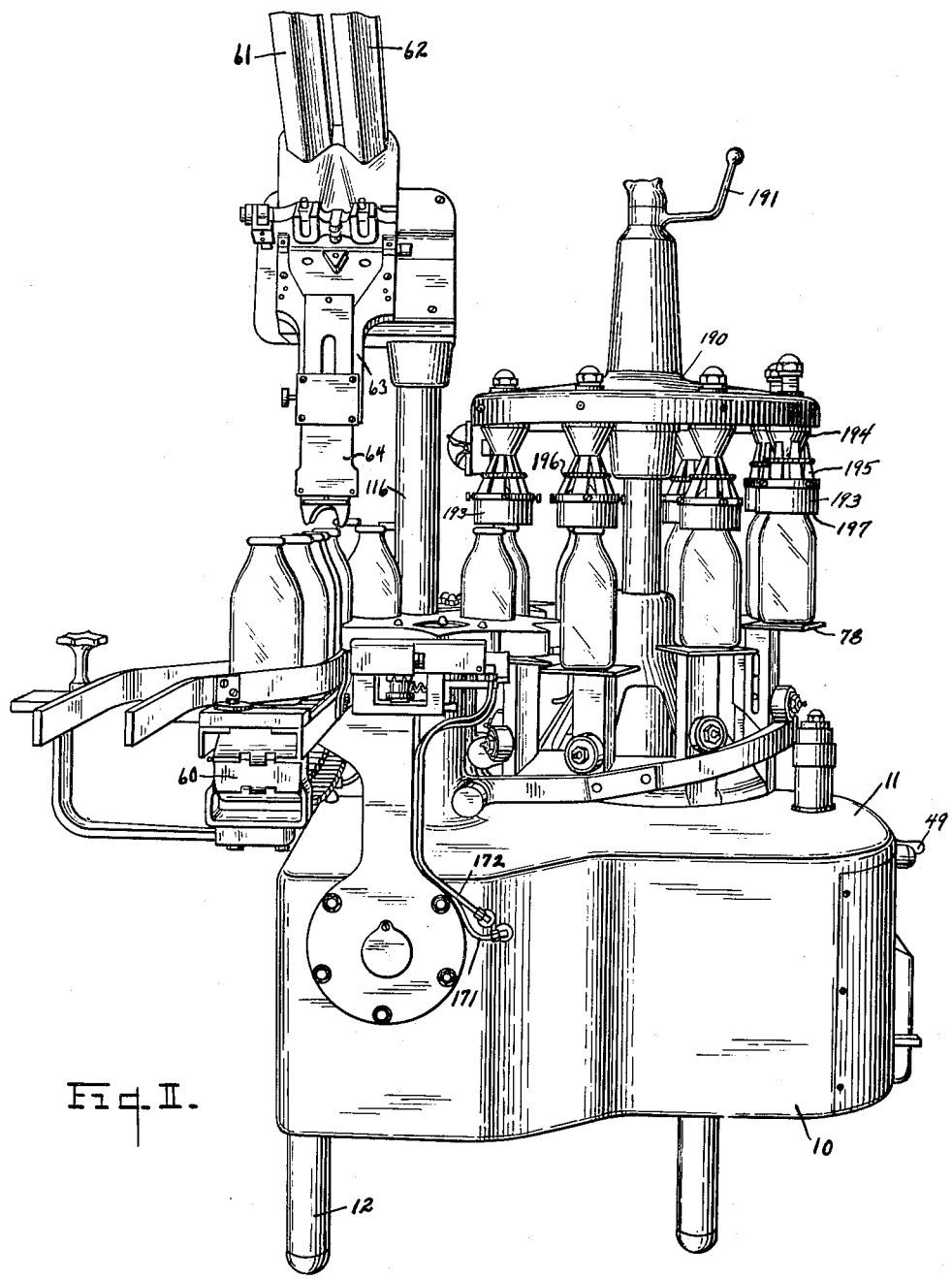

May 26, 1953 W. E. ZIMMERMANN 2,639,850
MACHINE FOR DATING AND APPLYING CLOSURES TO BOTTLES
Filed Jan. 23, 1950 9 Sheets-Sheet 3
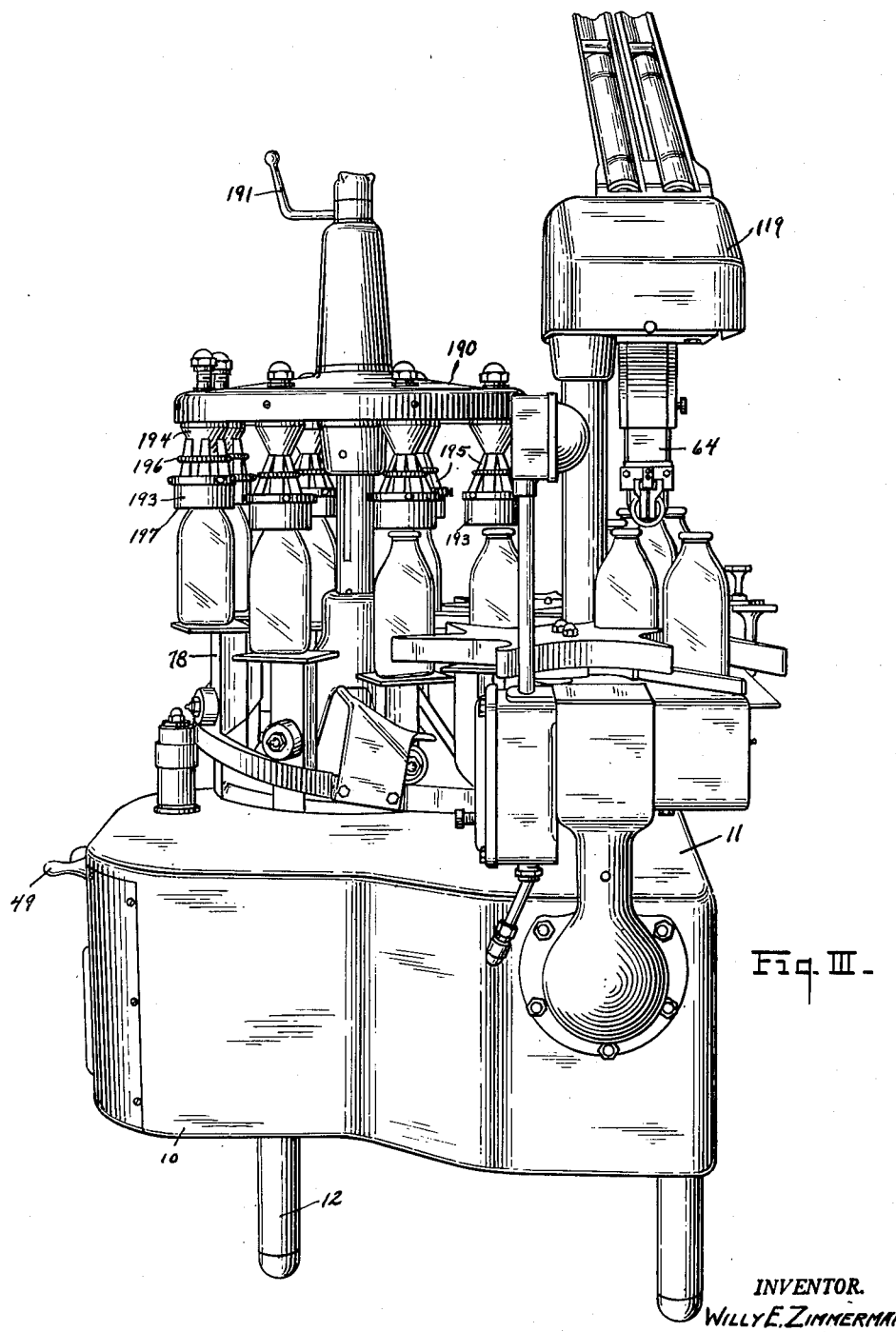
Fig. III.
INVENTOR.
Willy E. Zimmermann.
BY
Joseph B. Lindecker,
Att'y.

May 26, 1953 W. E. ZIMMERMANN 2,639,850
MACHINE FOR DATING AND APPLYING CLOSURES TO BOTTLES
Filed Jan. 23, 1950 9 Sheets-Sheet 4
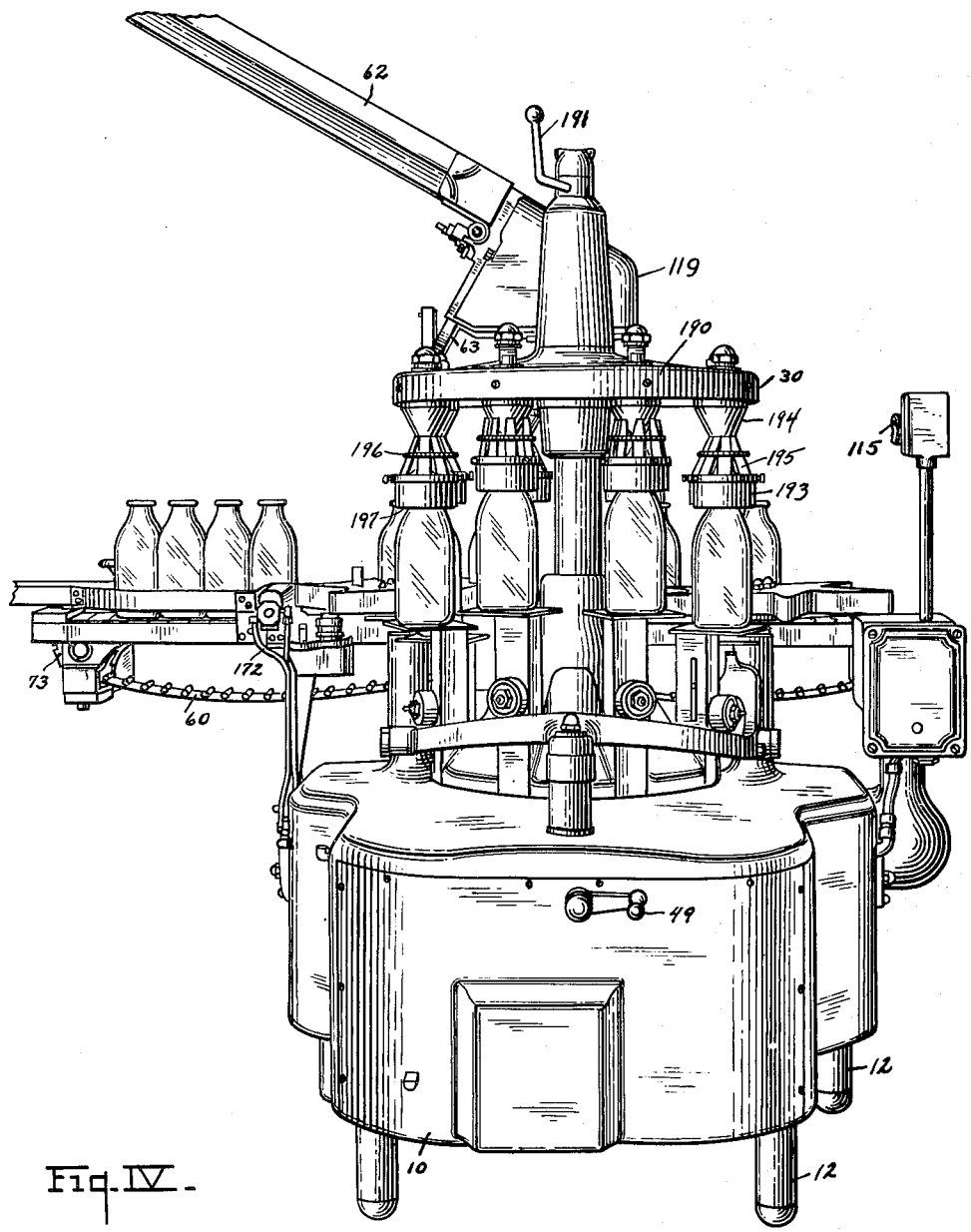
Fig. IV.
INVENTOR.
WILLY E. ZIMMERMANN.
BY
Joseph B. Lindecker
ATT'Y.

May 26, 1953 W. E. ZIMMERMANN 2,639,850
MACHINE FOR DATING AND APPLYING CLOSURES TO BOTTLES
Filed Jan. 23, 1950 9 Sheets-Sheet 5
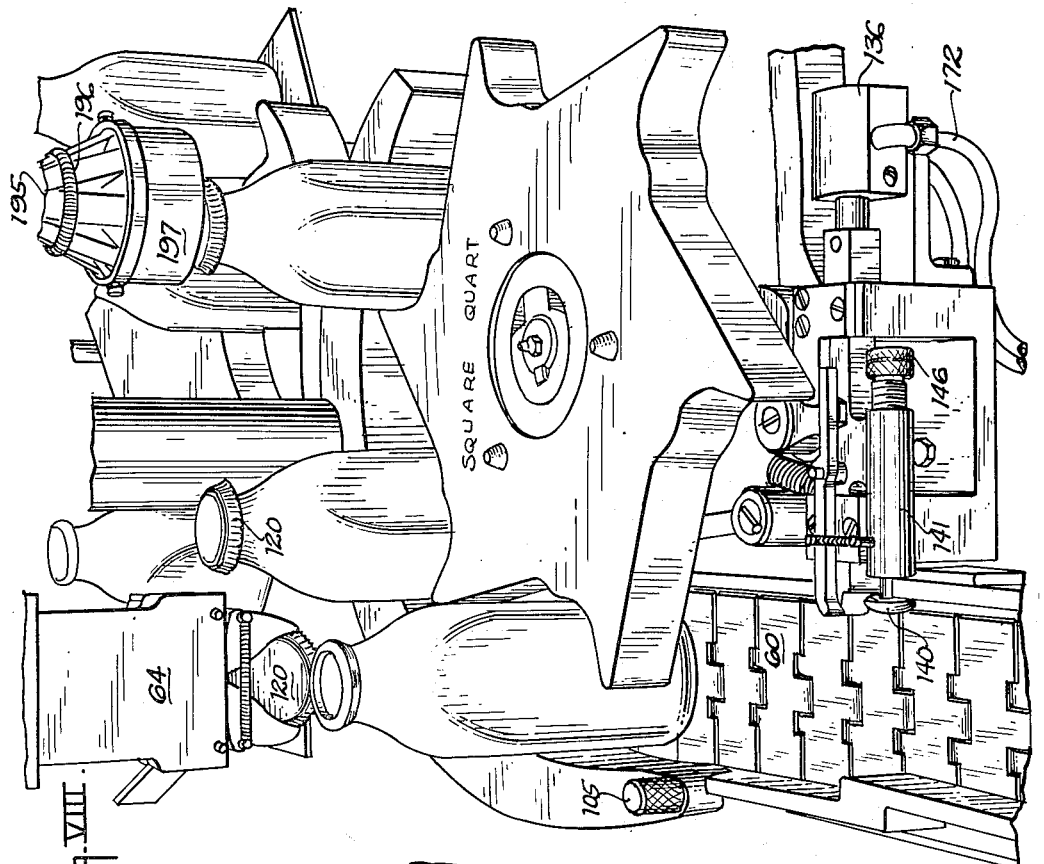
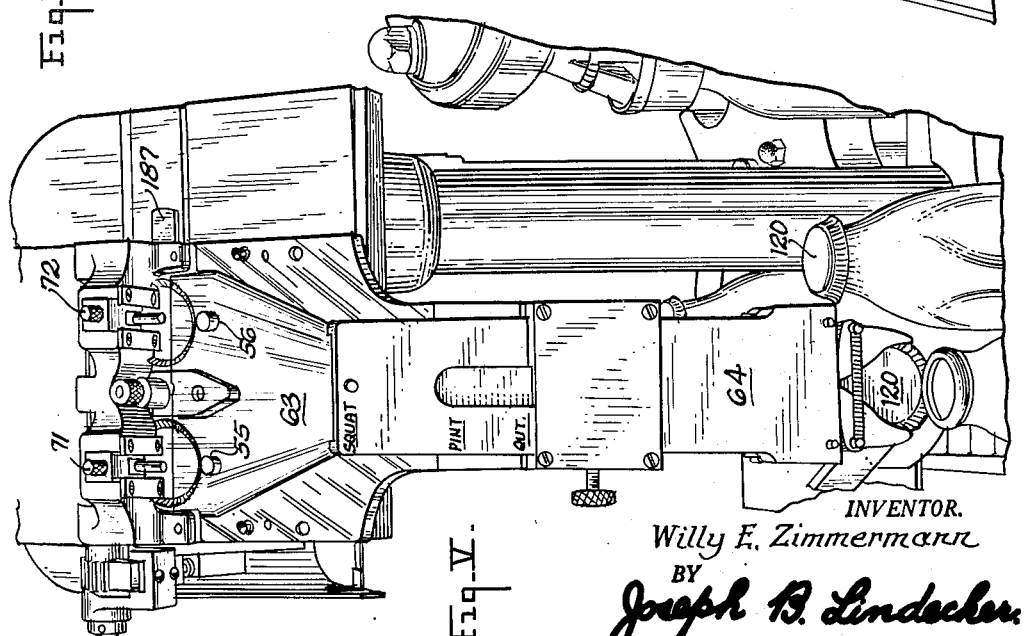
INVENTOR.
Willy E. Zimmermann
BY
Joseph B. Lindecker
Attorney

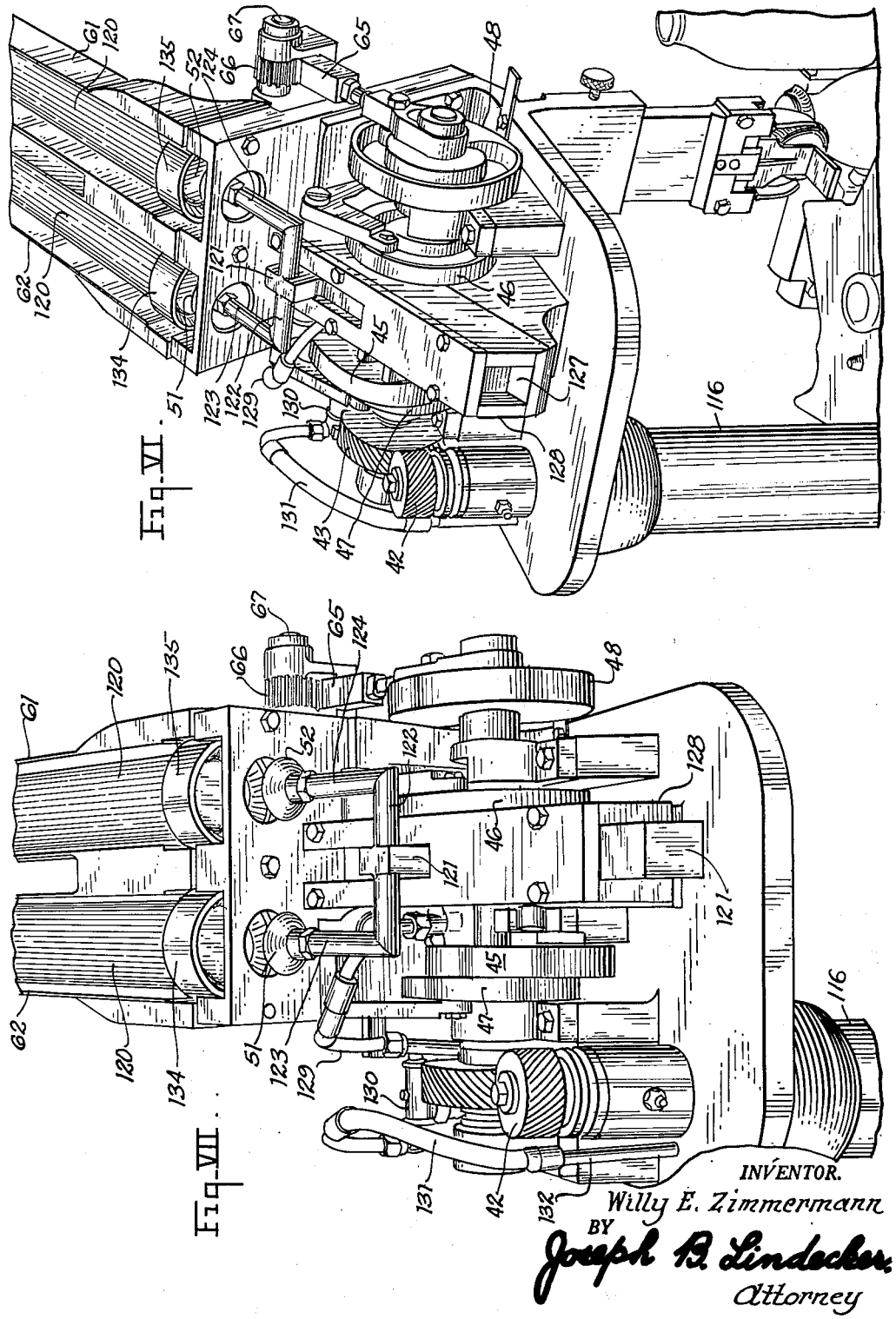

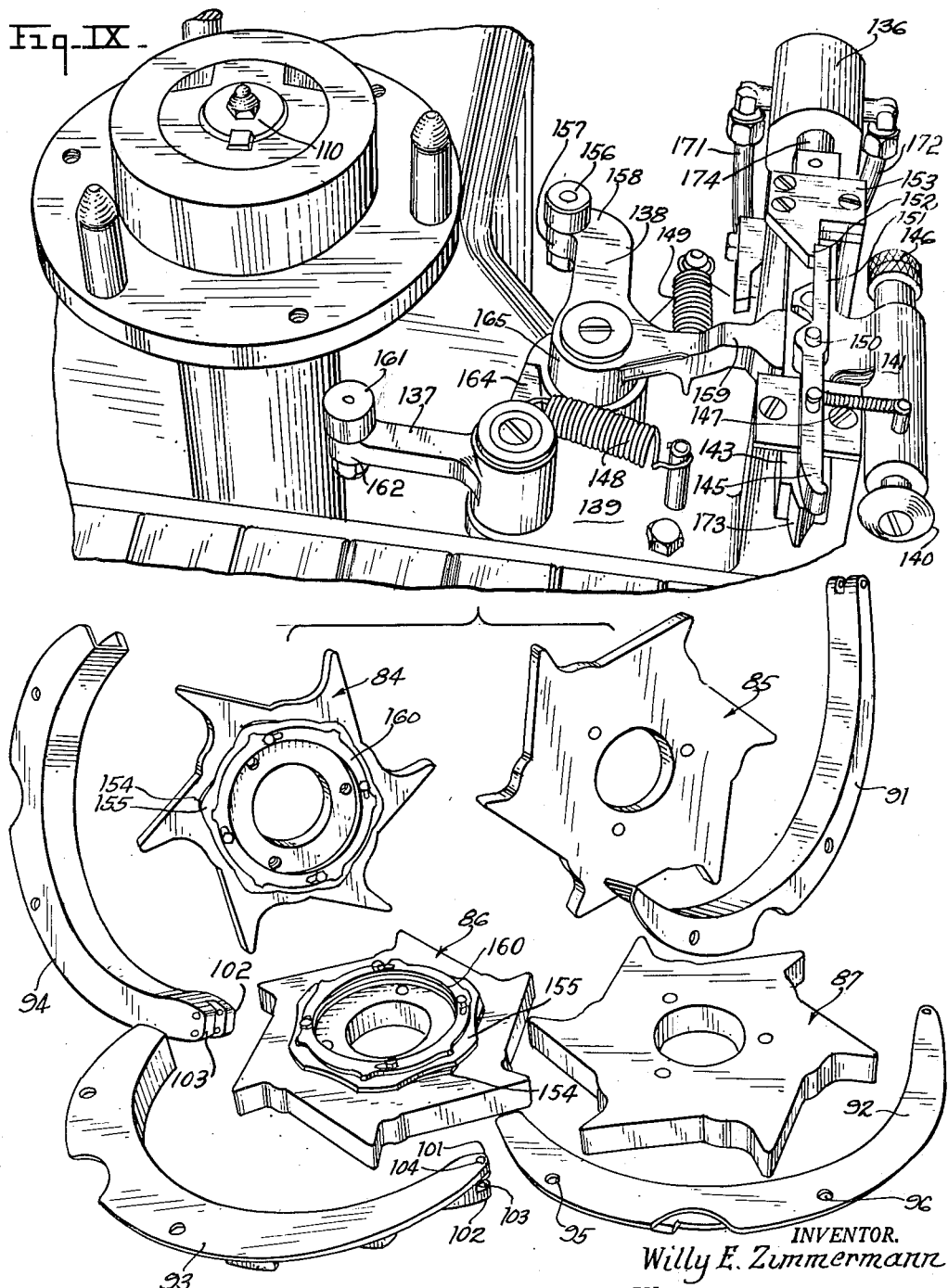
Fig. IX
Fig. X

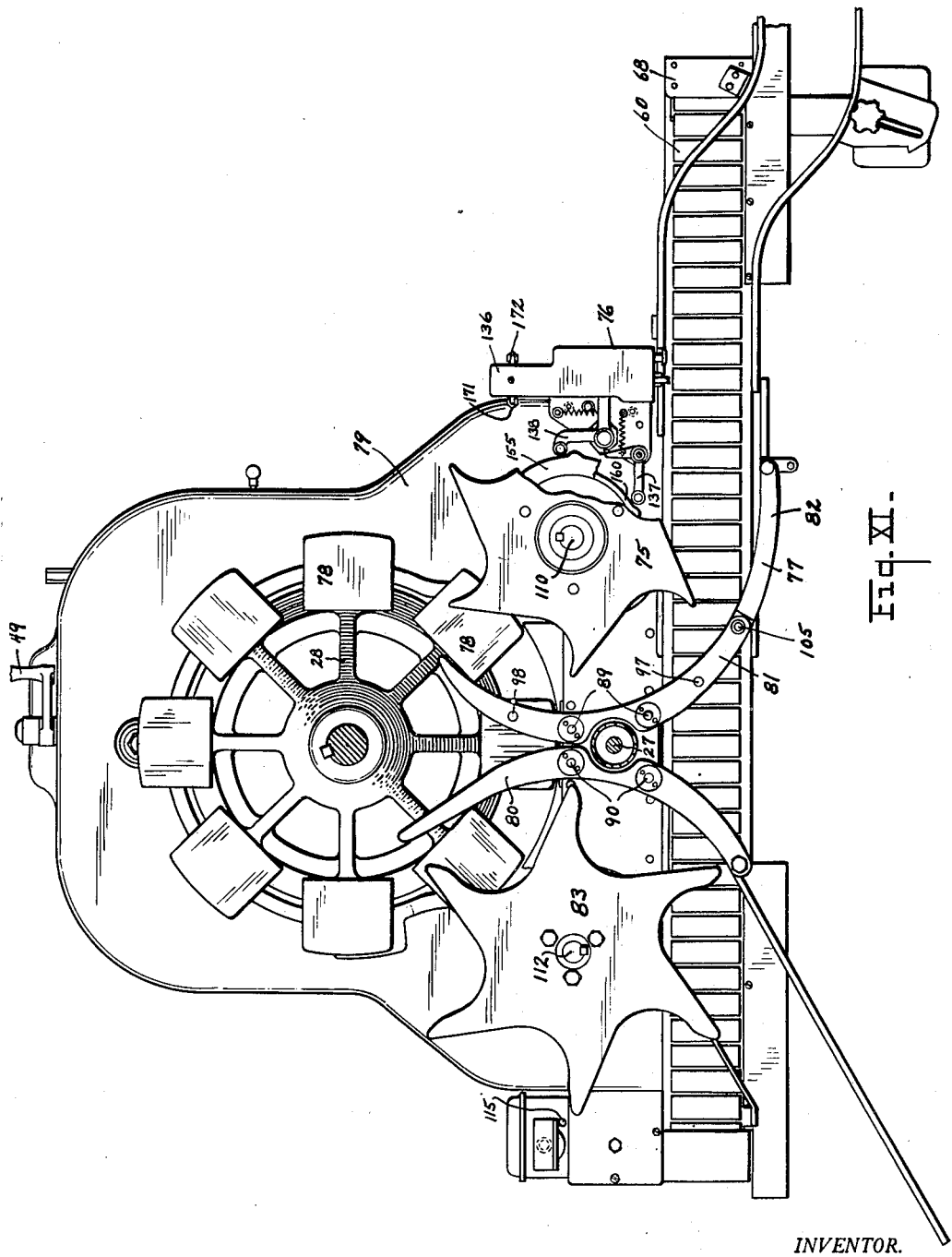

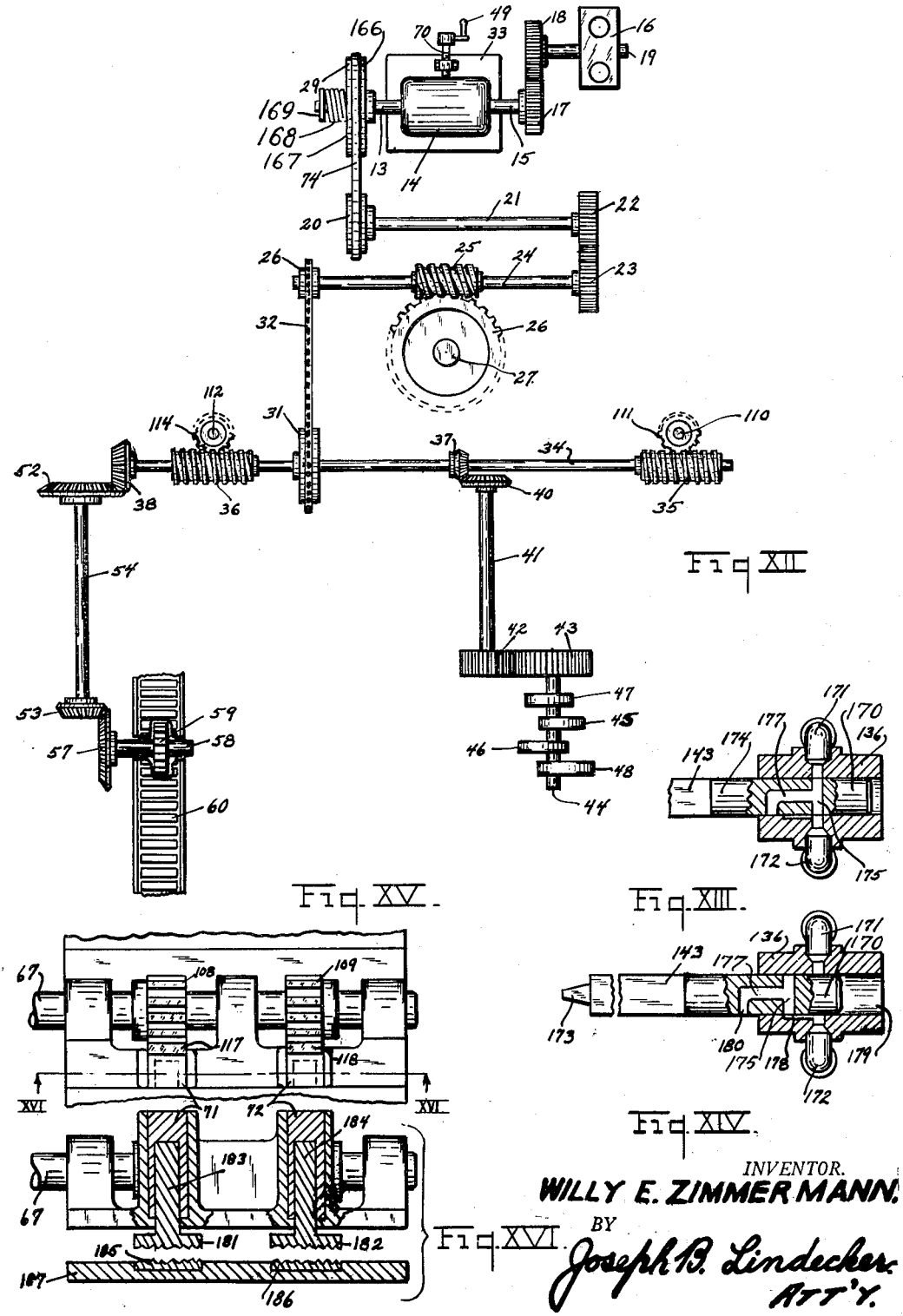

Patented May 26, 1953

2,639,850

UNITED STATES PATENT OFFICE 2,639,850

MACHINE FOR DATING AND APPLYING CLOSURES TO BOTTLES

Willy E. Zimmermann, Chicago, Ill., assignor to Standard Packaging Corporation, Chicago, Ill., a corporation of Virginia Application January 23, 1950, Serial No. 140,086

9 Claims. (Cl. 226—85)

This invention relates to a machine for applying closures to bottles, and more particularly to a machine for dating and feeding preformed closures to bottles and sealing same while said bottles are in motion.

The invention has an object: A machine of the type referred to embodying a particularly compact structure operable to apply closures to bottles at a comparatively high speed without damage to the closures or breakage to the bottles.

A further object of the invention embodies means for timing the movement of the bottles upon the conveyor which conducts them to a timing wheel which is synchronized with the closure sealing machine, said means to prevent jamming of the bottles, thereby eliminating the necessity of any careful attention by an operator.

The invention further relates to a closure marking apparatus and more particularly to an apparatus for marking or stamping the desired date upon the closures while the feeding mechanism is in operation and the closures are being transferred to the delivery chute.

The invention further involves a structure to use and seal closures upon bottles, said closures made from a lamination of paper and thin metal foil and sealed thereon without distorting or tearing the comparatively fragile closures.

The above and other objects and advantages will appear from the following description, appended claims, and accompanying drawings forming a part of this specification and in which:

Figure I is a front elevation of a sealing machine embodying my invention.

Figure II is a right side view of the machine shown in Figure I.

Figure III is a left side view of the machine shown in Figure I.

Figure IV is a rear elevation of the machine shown in Figure I.

Figure V is a fragmentary front view of the closure-feeding chute and closure-applying positioning mechanism separate from the remainder of the machine.

Figure VI is a fragmentary perspective side view of the closure-feeding mechanism with dating control mechanism associated therewith separate from the remainder of the machine.

Figure VII is a fragmentary rear view of the mechanism shown in Figure VI separate from the remainder of the machine.

Figure VIII is a fragmentary perspective plan view of the bottle feeding mechanism and contiguous portions of the machine and bottle conveyor.

Figure IX is a fragmentary perspective front view of the mechanism shown in Figure VIII with the bottle feed wheel removed.

Figure X is a perspective view of four different bottle feed wheels with associated bottle guides.

Figure XI is a fragmentary sectional view of the machine taken on a plane above the feed wheels showing the conveyor and bottle feed mechanism and contiguous portions of the machine.

Figure XII is a diagrammatic view illustrating the motor and drive mechanisms of the machine.

Figure XIII is a diagrammatic view illustrating the closure control valve in open position.

Figure XIV is the same as Figure XIII with valve in closed position.

Figure XV is a diagrammatic view showing the driving mechanism for the dating device.

Figure XVI is a sectional view taken on line 16—16 of Figure XV.

The dating, closure-applying and sealing machine illustrated in the drawings is a self-contained machine or unit and comprises a magazine for preformed closures, a closure-dating or printing station, a closure chute and closure applying station, and a plurality of closure-sealing heads. The closures are withdrawn two at a time from a dual chute type closure magazine by pneumatic means, said closures are dropped into the upper section of the closure delivery chute where they are held stationary for short duration to allow a pair of dating plungers to stamp the desired date thereon. After said dating is applied to the two closures, said closures pass to the vertical slide where they remain in a position for delivery to bottles at the closure applying station where one closure at a time is automatically placed on top of a filled bottle moving past beneath the closure. The filled bottle with a closure resting over its mouth portion moves on to one of a plurality of pedestals which move continuously in a circular direction. During this rotation the pedestal raises, causing the capped bottle to come in contact with closure sealing means after which said sealed bottle is conveyed to the bottle discharge wheel where it is passed to a moving conveyor for delivery. All the operations, including the closure withdrawing means, being automatic and interrelated by means of the common drive means.

In the embodiment of the invention illustrated in the drawings, the closure applying and sealing machine 10 comprises a main housing 11 with adjustable leg members 12. Supported within said housing 11 is a motor 14 equipped with a special shaft 13 and extension 15, which drives a shaft 19 assembled to a vacuum pump 16 by means of a pair of spur gears 17 and 18. The opposite end of shaft 13 is provided with a "Reeves" adjustable speed pulley 29 which drives a belt 74, said belt 74 drives a pulley 20 pressed upon a drive shaft 21. A spur gear 22 is secured to said drive shaft 21 and by the rotation thereof it drives a worm-shaft 24 through an intermediate spur gear 23. Said worm-shaft 24 carries and drives a worm 25 and a sprocket 26. Worm 25 drives a worm gear 26 assembled upon the vertical main shaft 27, which carries the horizontal pedestal carrier 28 and capping head bracket 30 with related parts. Sprocket 26 drives sprocket 31 through the intermediation of a chain 32 which drives a horizontal main worm drive shaft 34 provided with two worms 35 and 36 and two bevel gears 37 and 38. Bevel gear 37 meshes with bevel gear 40 which is mounted upon and drives a vertical cap feeder shaft 41, which in turn drives a helical gear 42 mounted upon the upper end thereof. Said helical gear 42 is in mesh with a helical gear 43 mounted upon one end of a horizontal cap feeder shaft 44, said shaft provided with four cams, a slide bar cam 45, an escapement plunger cam 46, an offset escapement plunger cam 47 and a dating cam 48. By driving the inside cap feeder shaft 44, said cams 45, 46, 47 and 48 turn with it and each perform a certain function. Slide bar cam 45 sets the vacuum cups 51 and 52 in motion by connecting means. Said escapement plunger cams 46 and 47 operate lever means connected to escapement plungers 55 and 56 located in upper closure chute as shown in Figure V, said escapement plungers 55 and 56 move outwardly to stop the closures falling from the magazines 61 and 62 long enough to allow dating plungers 71 and 72 to stamp dates thereon. Said cams 46 and 47 are so designed that one of said plungers 55 and 56 will remain for a longer period of time in said upper closure chute 63. This action regulates the discharge of caps into the lower part of the chute so that said closures drop one above the other into the vertical chute portion 64.

Said dating cam 48 as clearly shown in Figure VI causes the rack 65 to move back and forth, which in turn, through a co-acting spur gear 66 drives the dating device shaft 67. Said shaft 67 is provided with two spur gears 108 and 109 which co-act with the two dating plungers 71 and 72, said plunger 71 having a rack 117 and said plunger 72 having a rack 118 on one side of each to provide the necessary movement thereof.

The bevel gear 38 on one end of worm shaft 34 drives another bevel gear 52 on one end of the vertical conveyor drive shaft 54. Said shaft 54 has a bevel gear 53 secured at the upper end thereof and which meshes with a bevel gear 57 mounted upon one end of conveyor shaft 58. Said shaft 58 carries a conveyor drive sprocket 59 thereon for driving the conveyor 60. Said conveyor 60 travels in a conveyor channel supporting member 68, which supports a shaft 69 at the far end thereof, said shaft 69 carries a sprocket 73 for supporting the conveyor at the opposite end of the machine from that of the drive shaft and drive sprocket. Thus, rotation of the main worm shaft 34 through the previously described gearing imparts motion to the conveyor 60 and cams 45, 46, 47, and 48. By utilizing sprockets 59 and 73 having the proper number of teeth thereon, the speed of the conveyor 60 may be timed in proper relation to supply bottles to the in-feed star wheel 75. It will be noted that several bottles may be placed upon the conveyor 60 at the receiving end thereof and that the bottle separating, or timing unit 76, permits a single bottle at a time to pass and be engaged by the star wheel 75.

A curved adjustable bottle guide 77 has been provided which extends from a point adjacent the timing unit 76, around the star wheel 75 and to the nearest pedestal 78 of the pedestal carrier 28. The guide 77 is made of two sections 81 and 82, section 82 being removably secured to section 81. Section 81 is secured by locking means 89 to cap feeder bracket 88, said bracket 88 being welded upon the upper surface of housing 11. A second guide 80 of curved configuration extends from a point adjacent a pedestal carrying a sealed bottle around an out-feed star wheel 83 to the conveyor at the opposite end thereof. Said guide 80 is secured by locking means 90 to said cap feeder bracket 88.

Provision has been made for the accommodation of bottles of various sizes without necessitating material alteration of the machine. The conveyor 60 is preferably of a width to accommodate a half-gallon round bottle for example, or the largest size bottle with which the machine is to be used, and the timing unit 76 permits the passage of a bottle of that size. When it is desirable to accommodate the machine to smaller bottles, the bottle guide member 82 is removed and guides of different size and shape are substituted. The in-feed star wheel 75 is also removed and a wheel of different size is substituted. Bottles of various sizes require that the machine be run at various speeds. Change in speed is easily accomplished by the operator turning the crank 49, which turns threaded shaft 70, and moves motor 14 in a direction parallel to direction of belt 74. Movement of the motor 14 in either direction will cause the speed ratio between pulley 29 and pulley 20 to change. Pully 29 embodies two sheaves 166 and 167; sheave 166 is rigidly secured to shaft 13 while sheave 167 is slidably mounted upon shaft 13 and is also resiliently held and forced in a direction toward said sheave 166 by means of a spring 168. Said spring 168 is mounted between said sheave 167 and a collar 169, said collar being rigidly secured to the end of shaft 13. Therefore, when the operator turns said crank 49 and draws the motor 14 rearwardly, that is increasing the distance between the shafts 13 and 21, said sheaves 166 and 167 will be forced apart by belt 74 which is of constant length. Forcing the sheaves 166 and 167 apart decreases the driving diameter of said pulley 29, and since the motor 14 runs at a constant speed the speed of shaft 21 is decreased. If the crank 49 is turned in the opposite direction, the sheaves 166 and 167 come closer together, the driving diameter of pulley 29 is increased and the speed of shaft 21 is increased.

In order to accommodate smaller bottles, as for example, pints, ½ pints, quarts and square ½ gallon bottles, it has been found desirable to employ a plurality of inter-changeable star wheels 75 of appropriate size, preferably one for each size bottle. Four star wheels 84, 85, 86 and 87, and four bottle guides 91, 92, 93 and 94 are shown in Figure X of the drawings. Each guide is provided with two holes 95 and 96 to fit over pins 97 and 98, positioned in the guide member 81 which is stationary and forms a support for other guide placed thereupon to accommodate smaller bottles. The forward end of each replacement guide 91, 92, 93 or 94, is formed with two bosses 101 and 102, having vertical guide holes 104 and 103 therein. Knurled pin member 105 is suitable to fit in holes 104 and 103 for securing the bottle replacement guides to member 82, which has a boss 106 with a vertical hole 107 similar to and in alignment with holes 104 and 105.

The inlet feed star wheel 75, and other replacement star wheels are detachably mounted upon the upper end of shaft 110 driven by a worm gear 111. Said worm gear 111 meshes with worm 35 mounted upon shaft 34. The outlet feed star wheel 83 is mounted and secured upon the upper end of shaft 112 driven by a worm gear 114 which meshes with worm 36 mounted upon shaft 34.

In order that the gearing and star wheels above described may be performed in very accurate timed relation, the single motor 14, adjustably mounted upon plate 33, drives all the gears mounted on various drive shafts, connected together by gears, a belt and a chain. It will be understood that the conveyor 60 is also operated by the same motor 14 through the association of conveyor shaft 58 and sprocket 59. Said motor 14 is operated through a master control inclusive of a starting switch 115. In other words, the conveyor and machine operate as a unit: As the motor starts the conveyor 60 runs continuously in order to convey the filled bottles from a filling machine. Accordingly, as the uncapped bottle is conveyed by the conveyor 60, it engages the timing unit 76 and when it is allowed to pass by, it engages one of the pockets of the star wheel 75; thereafter it is moved to the nearest pedestal 78 and carried to a pocket in the outlet star wheel 83, after which it is moved to the opposite end of the conveyor 60 for discharge from the machine.

From the description thus far, it will be apparent that the uncapped bottles are fed in timed relation from the conveyor 60 into the star wheel 75 and onto the bottle pedestal 78. During the transfer of the bottles from the conveyor to the pedestal, a closure is deposited on the top of each bottle.

Carried on the upper portion of housing 11 is a cap feeder bracket 88 welded thereon and supporting a tubular member 116 surrounding cap feed shaft 41. Said member 116 supporting two magazines 61 and 62 for retaining the independent supplies of hood-type closures 120, the upper serving chute 63, the lower vertical serving chute 64, and housing 119 for enclosing the associated instrumentalities of the unit. The broad principal covering the shape of the magazine, means to retain closures therein, closure withdrawing means and associated instrumentalities of similar construction have been shown and described in Patent 2,304,146, owned and controlled by the assignee of this application. The magazines 61 and 62 retain a plurality of closures in nested formation. The closure withdrawing mechanism comprising a housing 119 adapted to receive for movement therein a reciprocable member 121 with associated hollow cross member 122 carrying a pair of interconnected spaced hollow plungers 123 and 124; clearly shown in Figures VII. The plungers are in axial alignment with the magazines carrying at their upper ends suitable fittings for removably supporting conically or cone shaped hollow flexible members 52 and 51. Each of said flexible members 52 and 51 through the hollow plungers and cross arm is in communication with reciprocable member 121 which is connected with the duct system of similar construction as described in Patent 2,304,146; said reciprocable member 121 sliding within opening 127 of housing 128. A vacuum line 129 is connected with interior of housing 128 and travels to a filter 130 which collects water or any other sediment drawn thereinto; said line 129 continues as a flexible tubing 131 which is connected with a pipe line 132 which travels downwardly through tubular member 116 to the interior of machine housing 11. Said line passes through one end wall of the machine and turns upwardly to communicate with a cylindrical body 136 associated with the bottle timing unit 76; the line travels from said body 136 to the vacuum pump 16 connected to motor 14, which is controlled by electrical switch 115.

There has been provided two cap retaining rings—134 and 135; one in the lowermost part of each magazine. Said rings prevent the withdrawal of more than one cap from each magazine by the rubber members 52 and 51 when a vacuum is in communication therewith. As stated before, the vacuum pump 16 is driven constantly as long as motor 14 causes pump shaft 19 to revolve; which in turn causes a constant vacuum to be transmitted to the rubber members 52 and 51 associated with the closure feeding mechanism, thus causing a closure to be withdrawn from each magazine on each stroke of said plungers 123 and 124. The constant feeding of closures to the closure chute by mechanism described above incorporating suitable means enclosed in housing 119 will continue as long as bottles advance to and pass by the timing unit 76.

The timing unit 76 is one of the most important parts of this machine. It consists of a timing device bracket 139 upon which the entire unit 76 is mounted. Said unit consists of a timing lever 137, a timing plunger lever 138, a timing plunger 143, a release lever 145, three springs 147, 148 and 149, and a coil spring operated bottle stop plunger with a mushroom shaped head on the outer end thereof 140; the opposite end thereof operating within a cylindrical body 141. Said plunger 140 being forced outwardly by a spring enclosed within the body 141, the resilient outward force of said spring being adjusted by turning knurled member 146, which operates against said spring within the body 141. As a bottle advances on the conveyor 60 it comes in contact with said mushroom head of plunger 140. Said member 140 absorbs the shock and moves inwardly and allows the bottle to pass onwardly and come in contact with one end of the release lever 145. Said lever 145 is pivoted intermediate, its ends upon pivot 150, mounted upon upper surface of plunger 143. The opposite end 151 of said lever 150 remains in a locking position in groove 152 of block 153, secured to the rear portion of bracket 139, due to spring 147 forcing said end 151 in a counter-clockwise direction, when there are no bottles present. When a bottle strikes the outer end of lever 145 and moves the opposite end 151 in a clockwise direction, removing same from slot 152, the bottle moves onwardly and comes into contact with the wedge-shaped end of the timing plunger 143. Said bottle is prevented from further movement until said plunger is moved in a direction away from said conveyor 60 by the action of plunger lever 138. Said lever 138 is pivoted intermediate, its ends upon bracket 139 with one arm end portion 159 thereof in contact with the timing plunger 143. If the star wheel 75 is in a position to receive the bottle being held by timing plunger 143, the control cam 160 mounted with two push back cams 154 and 155 on the underside of star wheel 75, will move the roller 161 mounted upon boss portion 162 which is formed on one of the ends of an arm of said timing lever 137; said lever being pivoted to said bracket 139. Movement of said roller and lever 137 in a counter-clockwise direction will also move the second arm 164, of said lever 137, in a counter-clockwise direction. Said movement of said arm 164, which is normally in a locked position with the hub portion 165 of timing plunger lever 138 due to the action of a coil spring 148, will now allow a coil spring 149 to pull and turn the timing plunger lever 138 in a counter-clockwise direction, thereby moving the timing plunger 143 inwardly. The movement of said plunger 143 allows the bottle to pass into the pocket of said star wheel 75. However, as soon as said bottle passes said plunger 143, the push back cams 154 and 155 contact the roller 156 mounted on boss portion 157 which is formed upon the free end 158 of timing plunger lever 138, thereby turning said lever 138 in a clockwise direction which pushes the timing plunger back to its original position. This action permits the release lever 145 to snap back into its original position because of the action of spring 147. Said action will cause the timing plunger 143 to close the free passage for the next bottle positioned upon the conveyor and said bottle must wait for repetition of the above procedure.

Movement of said timing plunger 143 has a second function: i. e., to govern the number of closures withdrawn from said magazines 61 and 62. When a constant flow of bottles pass said plunger 143, the vacuum or differential air pressure caused by pump 16 is transmitted substantially constantly to the closure withdrawing means 50 and 51. When no bottles are present and said plunger 143 is in an outward position to stop the next bottle being moved by the conveyor, said plunger operates a valve 170 within said cylindrical body 136 which opens a port between the vacuum line connected to the pump 16 and the atmosphere, thus preventing said differential pressure being communicated with the closure withdrawing means. Figures XIII and XIV show said body 136 with vacuum lines 171 and 172 connected thereto. Plunger 143 has a wedge shaped end 173 for contacting bottles and the opposite end 174 being of cylindrical formation, forms said valve 170. A transverse bore 175 is provided in said valve 170 to establish communication between vacuum line 172 connected to said pump 16, and vacuum line 171 connected with said closure feeding unit when bottles are passing by said end 173 of plunger 143 and said plunger is in the position shown by Figure XIII. A bore 177 for establishing communication between said vacuum line 172 and the atmosphere is disposed longitudinally with the axis of said cylindrical portion 174 of said plunger 143. Slot 178 is formed in the cylindrical wall 179 to connect said vacuum line 172 with bore 175 which connects with bore 177 and which connects with port 189 in communication with the atmosphere; this is clearly shown by Figure XIV. Therefore, when the plunger 143 is in the position shown by Figure XIV and the differential pressure is normalized in the lines to the closure feeding devices, no closures will be withdrawn from the magazines 61 and 62. The gearing of the closure feeding mechanism is so provided that two closures are withdrawn as every second bottle passes said timing plunger 143, even though said plunger is moved inwardly by each bottle as it passes the timing unit.

The apparatus herein shown for printing, embossing or otherwise marking preformed closures 120 which are being delivered through the gravity feed upper closure chute 63 to the vertical closure chute 64 to the mouths of bottles on which they are secured, is a very important part of this machine. The printing unit is constantly driven by means of motor 14 and other interconnected parts as mentioned above, such as spur gears 108 and 109 which co-act with plungers 71 and 72 and clearly shown by Figures V, XV, and XVI of the drawings. Plungers 55 and 56 located in the upper closure chute stop the closures falling from the magazines 61 and 62 long enough to allow embossing or the like. Said dating cam 48, rack 65, and spur gear 66 drive the dating device shaft 67 back and forth, which in turn elevates and lowers plungers 71 and 72. Said plungers are equipped with embossing or printing type members 181 and 182; usually they are female type where embossing is so desired. Said members 181 and 182 are provided with extension punching members 183 and 184 of substantially square cross-sections which can be easily removed for exchange or for changing data thereon. Said punching members being held in place by centering screws or other suitable means. Directly opposite said members 181 and 182, with punches 183 and 184, is a set of dies 185 and 186. Said dies are mounted in a plate 187 shown in Figures V and XVI. Said plate 187 fits in a groove provided in the upper surface of the upper closure chute 63, and suitably secured therein so it can be easily removed and a new plate inserted for incorporating new data corresponding to new data on punching members 183 and 184.

The operation of the feeding and dating apparatus is summarized as follows: A bottle advancing on the conveyor contacts the timing plunger and through the action of the timing lever and timing plunger lever, and co-acting parts, timing plunger 143 is forced inwardly against a coil spring until bore 175 is in alignment with vacuum lines 171 and 172. With the valve 170 in this position, differential pressure is communicated to the closure feeding unit. A pair of closures are fed to the upper closure chute 63, where plungers 55 and 56 stop said pair of closures for a short duration. The dating plungers are then lowered and, in cooperation with punches 183 and 184 and dies 185 and 186, desired printing or embossing is performed. Said dating plungers 71 and 72 are then raised. Plunger 55 is then lowered and a closure allowed to pass to the vertical closure chute 64. Plunger 56 is then lowered so the second closure can pass to said chute 64. Said closures remain in said vertical chute in closure applying position until removed by a bottle passing thereunder. The embossed closures are suspended in the path of the head of a milk bottle moving beneath said vertical chute. Thus the bottle to which the closure is applied moves to the star wheel 75 and to the pedestal 78 so that the closure may be sealed to the bottle. Removal of the closure and application of a closure to the bottle has been shown and described in Patent 2,493,212 owned by assignee of this invention. This completes the cycle of the embossing operation and the cycle will be repeated when two more bottles pass said timing plunger.

When the sealing of the closure upon the bottle is to be completed, the bottle with the closure applied thereto is moved by star wheel 75 to the nearest pedestal. The main shaft 27 carries a supporting head 190 which can be raised or lowered by turning the crank 191 in the proper direction. Said head 190 carries a plurality of sealing heads 193. The sealing heads are constructed according to structure shown in applicant's co-pending applications, Serial Numbers 735,011—1947, now Patent No. 2,544,626, and 35,592—1948, now Patent No. 2,546,205; said structure substantially the same and licensed under Patents 2,112,842 and 2,176,133. Said head 190 appearing in the drawings clearly shows the frusto-conically shaped member 194, the levers 195 and resilient extensible coil spring 196; said spring normally urges the upper portions of said levers 195 into contact with said cone shaped member 194. For guiding or centering the bottle and closure, a guide member 197 is employed in conjunction with said head 190 and removably secured thereto. A resilient rubber member within said head 190 conforms the closure to the bottle when the pedestal is raised. After the pedestal is lowered, said bottle passes to the star wheel 83 and thereafter to the discharge end of conveyor 60. This completes the cycle of the sealing mechanism.

It is apparent that, within the scope of the invention, modifications and different arrangements may be made other than is herein disclosed, and the present disclosure is merely illustrative, the invention comprehending all variations thereof.

What I claim is:

1. A machine for applying and sealing closures to bottles, having in combination; an independent supply of preformed closures, a closure applying station, a closure sealing device, a conveyor for supporting a plurality of bottles, a timing device which embodies a bottle stop and a bottle release lever; a star-wheel, said star-wheel having a single cam means attached thereto, said star-wheel having a double cam means attached thereto, said single cam means controlling said bottle release lever permitting bottles on the conveyor to pass to said star-wheel, said double cam means controlling the resetting of said bottle stop after a bottle has passed by the same, a constantly operated closure extracting device, said extracting device embodying a pair of vacuum cups, said vacuum cups utilizing normally reduced pressure for extracting closures from said independent supply of preformed closures, vacuum valve means to control the number of closures extracted from said supply and for delivering same to a discharge chute, said vacuum valve means controlled by said timing device when it is operated manually by a bottle on the conveyor, said chute embodying a closure embossing device, plungers arranged in said chute to restrict the movement of a pair of closures in said chute for embossing thereof, said plungers regulating the release of said pair of closures to the lower part of said chute to said closure applying station, and said star-wheel directing bottles with closures applied thereto to closure sealing device, substantially as described.

2. A machine for applying and sealing closures to bottles, having in combination; a dual chute holding an independent supply of preformed closures, a closure applying station, a closure sealing device, a conveyor for supporting a plurality of bottles, a timing device which embodies a bottle stop and a bottle release lever; a star wheel, said star wheel having a single cam means attached thereto, said star wheel having a double cam means attached thereto, said single cam means controlling said bottle release lever permitting bottles on the conveyor to pass to said star wheel, said double cam controlling the resetting of said bottle stop after a bottle has passed by the same, a power driven constantly operated closure extracting device, said extracting device embodying a pair of vacuum cups, said vacuum cups utilizing normally reduced pressure for extracting closures from said dual chute with said independent supply of preformed closures, a vacuum valve means to control the number of closures extracted from said supply and for delivering same simultaneously to a discharge chute, said vacuum valve means controlled by said timing device when it is operated manually by a bottle on the conveyor, a pair of escapement plungers arranged in said chute to restrict the movement of a pair of closures in said chute for embossing thereof, said escapement plungers regulating the release of said pair of closures in alternate sequence to the lower part of said chute embodying a single closure outlet, said star wheel directing bottles adjacent said outlet, means actuated by a bottle for releasing a closure from said outlet and depositing said closure upon said bottle, and said star wheel directing bottles with closures applied thereto to closure sealing device, substantially as described.

3. A machine for applying and sealing closures to bottles, having in combination; an independent supply of preformed closures, a closure applying station, a closure sealing device, a conveyor for supporting a plurality of bottles, a timing device which embodies a bottle stop and a bottle release lever; a star wheel, said star wheel having a single cam means attached thereto, said star wheel having a double cam means attached thereto, said single cam means controlling said bottle release lever permitting bottles on the conveyor to pass to said star wheel, said double cam controlling the resetting of said bottle stop after a bottle has passed by the same, a constantly operated closure extracting device, said extracting device embodying a plurality of vacuum cups, said vacuum cups utilizing normally reduced pressure for extracting closures from said independent supply of preformed closures, vacuum valve means to control the number of closures extracted from said supply and for delivering same to a discharge chute, said vacuum valve means controlled by said timing device when it is operated by direct contact by a bottle on the conveyor, said chute embodying a plurality of removable embossing dies, a plurality of power driven removable embossing members, said embossing members contacting the interior of said closures and pressing the exterior of said closures into contact with said dies, a plurality of movable escapement plungers which are power driven and controlled by cams and arranged in said chute to restrict the movement of a plurality of closures in said chute for embossing thereof, said escapement plungers regulating the release of said plurality of closures to the lower part of said chute, and said star wheel directing bottles with closures applied thereto to closure sealing device, substantially as described.

4. A machine for applying and sealing closures to bottles, having in combination; an independent supply of preformed closures, a closure applying station, a closure sealing device, a conveyor for supporting a plurality of bottles, a timing device which embodies a bottle stop and a bottle release lever; a star wheel, said star wheel having a single cam means attached thereto, said star wheel having a double cam means attached thereto, said single cam means controlling said bottle release lever permitting bottles on the conveyor to pass to said star wheel, said double cam controlling the resetting of said bottle stop after a bottle has passed by the same, a constantly operated closure extracting device, said extracting device embodying a plurality of vacuum cups, said vacuum cups utilizing normally reduced pressure for extracting closures from said independent supply of preformed closures, vacuum valve means to control the number of closures extracted from said supply and for delivering same to a discharge chute, said vacuum means controlled by said timing device operated by movement of a bottle on the conveyor, said chute embodying a closure embossing device, a plurality of escapement plungers arranged in said chute to restrict movement of a plurality of closures in said chute for embossing thereof, said escapement plungers being power driven and controlled by separate cams for regulating the release of closures to the lower part of said chute to said closure applying station, and said star wheel directing bottles with closures applied thereto to closure sealing device, substantially as described.

5. In closure applying machinery, in combination; a conveyor for carrying and advancing a succession of bottles to be closure sealed; a magazine at a stationary location retaining preformed closures composed of the lamination of paper and metal foil; a closure applying station, a mechanism for extracting a closure to be delivered from said magazine; a discharge chute mounted upon and above said machine and supporting said magazine, said chute adapted to hold successive preformed closures in the path of successive bottle heads of said succession to be engaged thereby and removed therefrom with the closure on the bottle head; a source of vacuum intermittently connected to said mechanism for extracting a closure from said magazine, a continuously moving conveyor for delivering bottles adjacent said chute, a star-wheel having a plurality of cams attached to the lower surface thereof, a timing device comprising a valve actuating means mounted adjacent said moving conveyor and actuated by the bottles on said conveyor to render said vacuum means effective, said chute embodying a power driven constantly operated closure embossing device, a continuously moving power driven escapement plunger in said chute to restrict the movement of a closure in said chute for embossing thereof, said escapement plunger regulating the release of said closure to the lower part of said chute to said closure applying station, said timing device further embodying means operated by one of said cams on the star-wheel to withdraw said valve actuating means from the conveyor to permit delivery of bottles to a series of heads corresponding to and advancing with said series of bottles to successively cooperate with the bottle heads and the closures thereon to squeeze and annularly contract the closure on the bottle heads and thus hold them while advancing until deformed in sealed condition, said timing device further embodying means operated by one of said cams on the star-wheel to reset said valve actuating means to restrict said bottles from passing to said heads; and a single motor with a single electrical switch associated therewith to drive and control the entire closure applying machinery.

6. In closure applying machinery, in combination; a conveyor for carrying and advancing a succession of bottles to be closure sealed; a plurality of magazines at a stationary location retaining preformed closures composed of a lamination of paper and metal foil; a closure applying station, a mechanism for extracting a closure to be delivered from said magazines; a discharge chute mounted upon and above said machine and supporting said magazines, said discharge chute incorporating therewith a closure embossing die and embossing punch adapted to emboss closures while in said discharge chute before they are conveyed to the closure applying station of said chute, said discharge chute adapted to hold successive preformed closures in the path of successive bottle heads of said succession to be engaged thereby and removed therefrom with the closure on the bottle head; a source of vacuum intermittently connected to said mechanism for extracting closures from said magazines, a power driven continuously moving conveyor for delivering bottles adjacent said chute, a star-wheel having a plurality of cams secured to the lower surface thereof, a timing device comprising a bottle stop and a valve actuating means mounted adjacent said moving conveyor and actuated by the bottles on said conveyor to render said vacuum means effective, a plurality of escapement plungers power driven and continuously moving and arranged in said chute to restrict the movement of a plurality of closures in said chute for embossing thereof, said escapement plungers regulating the release of said closures to the lower part of said chute to said closure applying station, said timing device further embodying means operated by one of said cams on said star-wheel to operate said bottle stop and allow bottles to be delivered to a series of heads corresponding to and advancing with said series of bottles to successively cooperate with the bottle heads and the closures thereon to squeeze and annularly contract the closure on the bottle heads and thus hold them while advancing until deformed into sealing condition, said timing device further embodying means operated by one of said cams on said star-wheel to reset said bottle stop to restrict the passage of bottles to said heads; and a single motor with a single electrical switch therewith to drive and control the entire closure applying machinery.

7. In closure marking, applying and sealing machinery, in combination; a common receiving device having a closure applying station with a single outlet, a pair of closure retaining chutes, each chute adapted to retain a plurality of closures to be delivered to said receiving device; a pair of continuously moving closure engaging means adjacent to said retaining chutes; a single mechanism for continuously moving said closure engaging means into extracting engagement with one closure from each of said retaining means, said mechanism embodying reduced pressure for transporting said closures simultaneously to said receiving device; a pair of closure embossing mechanisms, each pair comprising a punching member and a die, said embossing mechanism being continuously driven by power driven cams, said punching members being movable toward and from said dies, a pair of power driven escapement plungers for holding closures between said punching members and said dies; said escapement plungers operable to release said closures in sequence from said marking means to deposit the same in the lower portion of said receiving device; said closures being arranged in alternate sequence at said closure applying station; a star-wheel having cam means attached to the lower side thereof, a conveyor for delivering bottles adjacent said closure applying station; an air valve actuated by a bottle on the conveyor to release a pair of closures from said pair of closure retaining chutes, means actuated by each bottle on the conveyor to release a single closure from said closure applying station, and said cam means on said star-wheel controlling and timing delivery of bottles to said closure applying station.

8. A device of the class described comprising a pair of means for retaining independent supplies of preformed closures to be delivered; a receiving device for said closures having a single serving outlet; a mechanism embodying reduced pressure for extracting the next closure to be delivered from each of said independent supply and transporting said closures simultaneously to said receiving chute, a pair of closure embossing mechanisms assembled upon said receiving chute, each comprising a punching member and a die, said punching members being continuously driven by power driven cams and being movable toward and from said dies; a pair of closure escapement plungers continuously operated by individual power driven cams, operable to temporarily arrest the movement of a pair of said closures through said receiving device and retain same in the path of said punching members, said punching members embossing said retained closures when moved toward said dies, said continuously operated power driven escapement plungers controlled by said power driven cams whereby the simultaneously transported and marked closures are delivered in sequence to said single service outlet, a conveyor for carrying and advancing a succession of bottles to be closure sealed, a star-wheel having cam means attached to the lower side thereof, and timing mechanism embodying a valve operated by means in contact with a bottle on said conveyor and further controlled by said cam on said star-wheel for timing delivery of bottles to said closure serving chute to receive closures thereon, said valve controlling said cap extracting mechanism to deliver closures from said pair of closure retaining means.

9. A device of the class described comprising a plurality of means for retaining independent supplies of preformed closures to be delivered; a receiving device for said closures having a single serving outlet; a vacuum type mechanism for extracting the next closure to be delivered from each of said independent supply and transporting said closures simultaneously to said receiving chute, a closure embossing mechanism assembled upon said receiving chute embodying a plurality of embossing means each comprising a punching member and a die, said punching members being continuously driven by power driven cams and being movable toward and from said dies; a plurality of closure escapement plungers continuously driven by power driven cams and being movable above and below the upper surface of said receiving chute to temporarily arrest the movement of a plurality of said closures through said receiving device and retain same in the path of said punching members, said punching members embossing said retained closures when moved toward said dies, said continuously power driven escapement plungers being operated whereby the simultaneously transported and marked closures are delivered in sequence to said single service outlet, a conveyor for carrying and advancing a succession of bottles to be closure sealed; a star-wheel having cam means attached thereto, a timing mechanism embodying a valve operated by means in contact with a bottle on said conveyor, said timing mechanism further controlled by said cam operated means attached to said star-wheel for controlling said closure vacuum type extracting mechanism, said timing mechanism further controlled by said cam operated means for timing the delivery of said bottles successively to said closure serving chute to receive closures thereon, said conveyor moving said bottles with closures thereon to said star-wheel which further delivers them to closure crimping means to provide for full sealing of said closures, without mutilating, upon said bottles.

WILLY E. ZIMMERMANN.

References Cited in the file of this patent

UNITED STATES PATENTS

| Number | Name | Date |
| --- | --- | --- |
| 818,893 | Jung | Apr. 24, 1906 |
| 909,396 | Gilmore et al. | Jan. 12, 1909 |
| 2,026,856 | Youngdahl | Jan. 7, 1936 |
| 2,056,120 | Brinton | Sept. 29, 1936 |
| 2,076,116 | Brinton | Apr. 6, 1937 |
| 2,304,146 | Brinton | Dec. 8, 1942 |
| 2,313,828 | Lehmann et al. | Mar. 16, 1943 |
| 2,325,163 | Goodwin et al. | July 27, 1943 |
| 2,361,176 | Carvey | Oct. 24, 1944 |
| 2,380,194 | Sharp | July 10, 1945 |
| 2,493,212 | Zimmerman et al. | Jan. 3, 1950 |